United States Patent
Strutz et al.

(10) Patent No.: US 8,902,057 B2
(45) Date of Patent: Dec. 2, 2014

(54) BELT BUCKLE FOR A MOTOR VEHICLE

(75) Inventors: Torsten Strutz, Wolfsburg (DE); Jörg Winkler, Salzgitter (DE); Peter Baumann, Wunstorf (DE); Andre Leschke, Wolfsburg (DE)

(73) Assignee: Volkswagen Aktiengesellscaft, Wolfsburg (DE)

( * ) Notice: Subject to any disclaimer, the term of this patent is extended or adjusted under 35 U.S.C. 154(b) by 2123 days.

(21) Appl. No.: 11/708,821

(22) Filed: Feb. 21, 2007

(65) Prior Publication Data

US 2007/0221428 A1 Sep. 27, 2007

(30) Foreign Application Priority Data

Feb. 21, 2006 (DE) .......................... 10 2006 007 957
Sep. 9, 2006 (DE) .......................... 10 2006 042 455

(51) Int. Cl.
*B60Q 1/00* (2006.01)
*B60R 22/48* (2006.01)
*B60R 21/01* (2006.01)

(52) U.S. Cl.
CPC ......... *B60R 22/48* (2013.01); *B60R 2022/4816* (2013.01); *B60R 2021/01088* (2013.01)
USPC ....... 340/457.1; 24/633; 180/286; 280/801.1; 701/45

(58) Field of Classification Search
USPC .............................................. 340/457.1, 457
See application file for complete search history.

(56) References Cited

U.S. PATENT DOCUMENTS

| | | | |
|---|---|---|---|
| 6,025,783 A * | 2/2000 | Steffens, Jr. ................... | 340/644 |
| 6,362,734 B1 | 3/2002 | McQuade et al. | |
| 7,002,457 B2 * | 2/2006 | Stevenson et al. ......... | 340/457.1 |
| 7,411,505 B2 * | 8/2008 | Smith et al. ................ | 340/572.4 |
| 7,642,907 B2 * | 1/2010 | Tang et al. .................. | 340/457.1 |
| 2004/0036345 A1 | 2/2004 | Herberg et al. | |
| 2004/0119599 A1* | 6/2004 | Stevenson et al. ......... | 340/686.1 |
| 2005/0061568 A1 | 3/2005 | Schondorf et al. | |
| 2005/0151375 A1* | 7/2005 | Cheung et al. ................ | 290/1 R |
| 2006/0139159 A1 | 6/2006 | Lee et al. | |
| 2007/0139173 A1* | 6/2007 | Tang et al. ............... | 340/426.16 |
| 2008/0042816 A1* | 2/2008 | Pennisi et al. ................ | 340/441 |
| 2008/0319614 A1* | 12/2008 | Kuhn et al. ..................... | 701/45 |

FOREIGN PATENT DOCUMENTS

EP 1588908 A1 * 10/2005

* cited by examiner

*Primary Examiner* — Brian Zimmerman
*Assistant Examiner* — Sara Samson
(74) *Attorney, Agent, or Firm* — Manfred Beck, P.A.

(57) ABSTRACT

A belt buckle for a motor vehicle is provided wherein, through the use of the belt buckle, a tongue of a seat belt is mechanically receivable and, through the use of a switch, an insertion status of the tongue is detectable. A device is assigned to the switch through the use of which the switch position of the switch is wirelessly communicable to a receiver circuit.

7 Claims, 2 Drawing Sheets

BELT BUCKLE FOR A MOTOR VEHICLE

BACKGROUND OF THE INVENTION

Field of the Invention

The invention relates to a belt buckle for a motor vehicle, wherein the belt buckle is configured to receive a tongue of a seat belt and wherein an insertion status of the tongue is detectable with a switch.

Conventional belt buckles have a switch whose switch position is dependent on whether or not the tongue of a seat belt is inserted into the belt buckle. As a rule, the switch is in this case closed, if the tongue is inserted, and the switch is open, if the tongue is not inserted. However, this principle can also be reversed without limitations. The information is transmitted to an evaluation unit, which is for example accommodated in the instrument cluster, in order to generate a warning if necessary, when a belt buckle has not been closed. This warning may for example be combined with a seat occupancy recognition. In conventional systems the switch of the belt buckle is read through the use of cables. As a result, the cabling has to be unplugged in case of removable seats and has to be plugged in again when the seats are installed again.

SUMMARY OF THE INVENTION

It is accordingly an object of the invention to provide a belt buckle for a motor vehicle which overcomes the above-mentioned disadvantages of the heretofore-known belt buckles for motor vehicles of this general type. The invention is in particular concerned with the technical problem of providing a belt buckle for motor vehicles whose switch state can be read and which allows a user-friendly removal and/or installation of motor vehicle seats.

With the foregoing and other objects in view there is provided, in accordance with the invention, a belt buckle for a motor vehicle wherein, through the use of the belt buckle, a tongue of a seat belt is mechanically receivable and, through the use of a switch, an insertion status of the tongue is detectable, wherein a device is assigned to the switch through the use of which the switch position of the switch is wirelessly communicable to a receiver circuit.

By providing a device which is assigned to the switch and through the use of which the switch position of the switch is wirelessly communicable to a receiver circuit, it is possible to save the conventional cabling of the belt buckle which simplifies the installation of the vehicle seat during the manufacturing as well as a subsequent removal and re-installation of the vehicle seat.

In accordance with a feature of the invention, the belt buckle or the switch has at least one identifier assigned thereto which is communicated with the switch position of the switch. As a result, it is possible to unambiguously attribute in the receiver circuit which of the vehicle seats have their respective belt buckles closed. The receiver circuit or an evaluation unit provided downstream preferably has information about the seat occupancy such that individual seats can be warned in a targeted manner, whereas unoccupied seats can be ignored.

In accordance with a further preferred embodiment of the invention, the device includes an electromechanical energy converter which generates electric energy at least during a change of the switch position and feeds it to a transmitter which then communicates the switch position wirelessly to the receiver circuit. This embodiment has an active transmitter or active sender. It is to be noted, that in an embodiment in which there is a transmission only in case of a change of the switch position, the receiver circuit should be connected to the unswitched battery voltage terminal which is customarily referred to as the KL. 30 terminal, because otherwise a change of the switch position would not be detected when the ignition is switched off (switched battery voltage terminal KL. 15 off). The receiver circuit is therefore preferably optimized for a low standby current or quiescent current and is furthermore preferably assigned to a standby current load that is already present such as the central locking system. In principle, the use of an electromechanical energy converter with an active transmitter is also suitable for controlling other vehicle components such as power windows or as a remote control for a central locking system.

In a further preferred embodiment, the electromechanical energy converter is embodied as a piezoelectric crystal or as an induction generator. In case of the latter, a magnet is moved relative to a coil by inserting or removing the tongue from the belt buckle and, as a result, a voltage is induced. Since the voltage is proportional to the variation of the magnetic field over time, the relatively fast movement of the belt buckle spring during latching or releasing is preferably utilized. This has the further advantage that the signal is generated only if the tongue is actually latched and not already when the tongue is inserted.

In a further preferred or alternative embodiment, an RF-ID (radio frequency identification) tag with at least one switchable ID is assigned to the switch and a switching between two IDs is done by the switch position of the switch. Depending on the switch position one or the other ID is then transmitted. RF-ID tags are usually passive transmitters, i.e. they do not have their own energy supply, but they extract energy from the received electromagnetic waves. This extraction of energy can then be measured by an RF reader and the identifier can be detected. In principle is also possible to have an embodiment with an RF-ID tag that has only a fixed identifier. In this case the RF-ID tag would preferably only transmit the status of a closed switch. It is also possible to use two RF-ID tags with fixed, but different IDs, wherein a switchover to one or the other RF-ID tag is performed depending on the switch position. The advantage of the RF-ID tag with switchable IDs is however that both switch positions can be transmitted with one RF-ID tag.

The RF-ID reader, in other words the receiver circuit, then preferably reads the individual RF-ID tags in the motor vehicle in a time-division multiplex and then communicates them to a control device or directly to an associated bus system, such as a CAN (controller area network) bus so that the status of the belt buckles is available for the involved control devices.

It is noted that it is in principle also possible to assign an electromechanical energy converter to the RF-ID tags so that they can also transmit in an active manner.

In a further alternative embodiment, an LC oscillator circuit is assigned to the switch, wherein the oscillator circuit is detunable through the use of the switch. Further, a capacitor is connected into the LC oscillator circuit or is disconnected from the LC oscillator circuit through the use of the switch of the belt buckle. An exciter coil is in this case preferably assigned to the LC oscillator circuit, wherein the exciter coil is furthermore preferably disposed in the vehicle floor. The LC oscillator circuit is preferably excited in a cyclical manner through the use of the exciter coil. The excitation occurs in this case preferably after the ignition has been turned on (KL15 on). The response of the LC oscillator circuit is then detected by the exciter coil. In this case, it is then possible to detect at the exciter coil whether the LC oscillator circuit is at resonance or whether it is detuned. It is also possible to determine whether a vehicle seat is present at all.

In a further preferred embodiment, a transponder is assigned to the switch, wherein the transponder is disposed in or at the vehicle seat and transmits a switch position of the belt buckle. The transponder preferably operates in this case via a 125 kHz interface as is for example also known in the case of immobilizer systems. The coverage or operating range of the transponder is in this frequency range only in the range of a few centimeters. Each vehicle seat or transponder has therefore preferably a read coil assigned thereto, which is then connected to a control device.

In a further preferred embodiment, at least a further seat status sensor, whose status is communicable to the receiver circuit, is assigned to the device, wherein furthermore preferably a further switch is assigned to this seat status sensor. The further seat status sensor is preferably embodied as a seat occupancy sensor.

In principle it is also possible to use the information transfer with the active transmitter, the RF-ID tag, or the LC oscillator circuit, as described above for the belt buckle, solely for a seat status sensor such as the seat occupancy sensor, wherein, with respect to such embodiments, reference is made to the above-described embodiments of the belt buckle.

With the objects of the invention in view there is also provided, in combination with a motor vehicle having a seat belt with a tongue, a belt buckle configuration which includes:

a belt buckle configured to mechanically receive the tongue of the seat belt;

a switch operatively connected to the belt buckle, the switch being configured to detect an insertion status of the tongue of the seat belt;

a communicating device operatively connected to the switch; and a receiver circuit operatively connected to the communicating device, the communicating device being configured to wirelessly communicate a switch position of the switch to the receiver circuit.

According to another feature of the invention, the belt buckle has an identifier assigned thereto; and the communicating device is configured to wirelessly communicate the identifier assigned to the belt buckle together with the switch position of the switch.

According to yet another feature of the invention, the communicating device includes an electromechanical energy converter and a transmitting device, and the electromechanical energy converter generates energy when the switch changes the switch position and supplies the energy to the transmitting device.

According to a further feature of the invention, the electromechanical energy converter is a piezoelectric crystal or an induction generator.

According to another feature of the invention, an RF-ID tag is operatively connected to the switch, the RF-ID tag has at least one switchable ID such that a switching between two IDs is done by the switch position of the switch.

According to another feature of the invention, an LC oscillator circuit is operatively connected to the switch such that the LC oscillator circuit is detunable with the switch.

According to another feature of the invention, the motor vehicle includes a vehicle seat; and the communicating device includes a transponder disposed in or at the vehicle seat, and the transponder communicates the switch position of the switch to the receiver circuit.

According to another feature of the invention, the communicating device includes a seat status sensor for sensing a seat status, and the communicating device is configured to communicate the seat status to the receiver circuit.

According to another feature of the invention, the seat status sensor is a seat occupancy sensor.

Other features which are considered as characteristic for the invention are set forth in the appended claims.

Although the invention is illustrated and described herein as embodied in a belt buckle for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
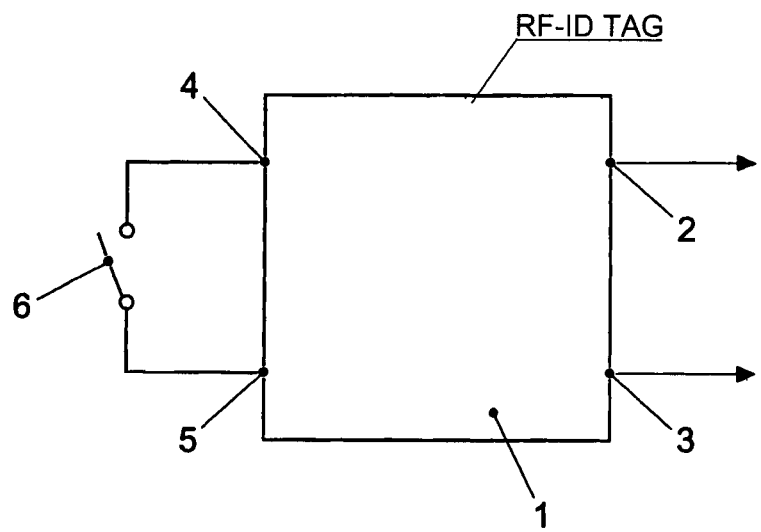
FIG. 1 is a schematic view of a circuit diagram of an RF-ID tag according to the invention.

Referring now to the figures of the drawings in detail, and first, particularly, to FIG. 1 thereof, there is shown an RF-ID (radio frequency identification) tag 1, which has four pins 2-5. Pins 2, 3 are in this case connected to an antenna (not shown) wherein the antenna is embodied as a coil or as a dipole antenna depending on the desired frequency. The RF-ID tag receives electromagnetic waves via this antenna from a transmitter (not shown). A typically used type of RF-ID tags is based on the passive resonance operation. In this case, a resonant circuit is tuned in dependence of the ID. The transmitter sweeps the frequency band wherein the maximum power is coupled into the RF-ID tag at the resonant frequency of the RF-ID tag. This maximized extraction of energy can be detected by an RF (radio frequency) reader. However, many different modifications and variations of this principle are known and thus the above explanation is only exemplary and is not to be understood in a limiting sense.

A switch 6 of the belt buckle is provided at the two other pins 4, 5 of the RF-ID tag wherein the switch 6 is connected between the pins 4, 5. The switch 6 is in this case for example actuated by a spring, which in turn is moved by the insertion tongue of the seat belt and, respectively, the release mechanism. In this case, the switch 6 is closed when the insertion tongue is inserted. The RF-ID tag 1 is in this case embodied such that it has a switchable ID, i.e. it has an ID1 when the switch 6 is open and an ID2 when the switch is closed. As a result, the switch position of the switch 6 can be detected by the RF reader (not shown).

Figure 2:
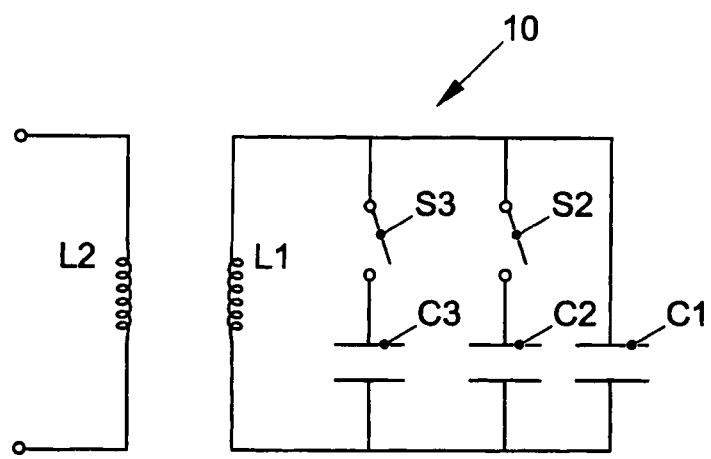
FIG. 2 is a schematic view of a circuit diagram of a detunable LC oscillator circuit according to the invention.

A similar principle is possible with an LC oscillator circuit as is shown in FIG. 2. The LC oscillator circuit 10 includes an inductance L1, a first capacitance C1, as well as a second and a third capacitance C2 and C3.

The inductances L1, L2 and, respectively, the capacitances C1-C3 are in this case usually formed by coils and, respectively, capacitors. A switch S2 and, respectively, S3 is in each case assigned to the capacitances C2, and respectively, C3, wherein the switch S2 is assigned to a seat occupancy sensor and the switch S3 is assigned to a belt buckle. The switch S3 therefore corresponds to the switch 6 of FIG. 1. An exciter coil L2, which is for example disposed in the vehicle floor, is assigned to the inductance L1.

The total capacitance changes in dependence of the switch position of S2 and S3, wherein furthermore C2 and C3 are preferably selected such that their capacitances are different from one another, in order to unambiguously distinguish all switch position combinations. Depending on the effective capacitance, the resonant frequency of the LC oscillator circuit 10 also changes. If the LC oscillator circuit 10 is excited by the exciter coil after the terminal No. 15 (ignition/positive line) is energized, then it is possible to measure the resonant frequency of the LC oscillator circuit as a feedback from the LC oscillator circuit 10 to the exciter coil L2 and from that the switch position of S2 and S3 can be determined. Even a removed vehicle seat can be detected because in this case, the LC oscillator circuit 10 is not present and, consequently, the exciter coil L2 detects no feedback.

Figure 3:
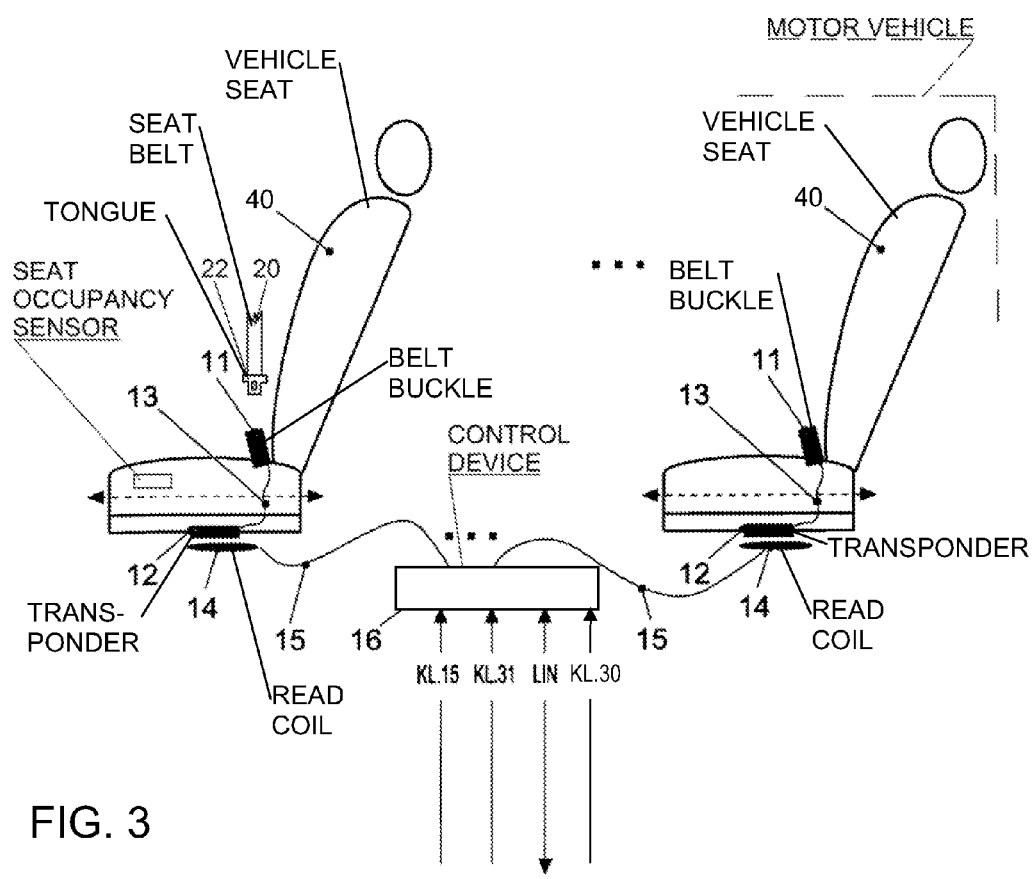
FIG. 3 is a schematic view of a circuit diagram of a configuration having transponders in accordance with the invention.

FIG. 3 shows a configuration of several vehicle seats 40 in a motor vehicle, which is only schematically indicated by a dashed line, wherein each of the vehicle seats 40 has a belt buckle 11 with a switch. The seat belt 20 and the tongue 22 of the seat belt are also shown in FIG. 3. A transponder 12, which is connected to the switch via a connection 13, is disposed in each vehicle seat 40. A read coil 14, which is preferably disposed on the vehicle floor, is disposed under each vehicle seat 40. The read coil 14 is connected to a control device 16 via a connection 15. The control device 16 can in this case evaluate and further process the switch states of the switches of the belt buckles or, alternatively, as shown, can transmit the switch states via a bus system, e.g. a LIN (Local Interconnect Network) bus, to a control device, e.g. the airbag control device, the instrument cluster control device or a combined control device for a further processing. Terminal No. 15 (battery voltage switched by ignition) and terminal No. 31 (ground) are indicated as KL. 15 and KL. 31 in FIG. 3. The reading or sensing operates in this case preferably such that the control device 16 excites the read coil, wherein the emitted electromagnetic field of the read coil 14 is received by the transponder 12. The transponder 12 absorbs energy from the electromagnetic field for its energy supply. The transponder 12 transmits a signal which depends on the switch position, wherein the signal is received by the read coil and is passed on to the control device 16. The transponder 12 may for example transmit an ID in case of a closed switch and may transmit an inverted ID in case of an open switch. The interface between the read coil 14 and the transponder 12 is preferably embodied as a 125 kHz air interface. This application claims the priorities, under 35 U.S.C. §119, of German Application DE 10 2006 007 957.4, filed Feb. 21, 2006 and German Application DE 10 2006 042 455.7, filed Sep. 9, 2006; the prior applications are herewith incorporated by reference in their entirety.

What is claimed is:

1. In combination with a motor vehicle having a seat belt with a tongue, a belt buckle configuration comprising:
   a belt buckle configured to mechanically receive the tongue of the seat belt;
   a switch operatively connected to said belt buckle, said switch being configured to detect an insertion status of the tongue of the seat belt;
   a communicating device operatively connected to said switch, said communicating device including an electromechanical energy converter and a transmitting device, said electromechanical energy converter including an induction generator, said induction generator generating energy when said switch changes a switch position and supplying the energy to said transmitting device;
   said induction generator including a magnet and a coil;
   said belt buckle including a belt buckle spring configured to provide a movement during latching or releasing the tongue such that said magnet and said coil move relative to one another for inducing a voltage; and
   a receiver circuit operatively connected to said communicating device, said communicating device being configured to wirelessly communicate the switch position of said switch to said receiver circuit.

2. The belt buckle configuration according to claim 1, wherein:
   said belt buckle has an identifier assigned thereto; and
   said communicating device is configured to wirelessly communicate the identifier assigned to said belt buckle together with the switch position of said switch.

3. The belt buckle configuration according to claim 2, including an RF-ID tag operatively connected to said switch, wherein said RF-ID tag operates as said transmitting device and wherein said RF-ID tag has at least two IDs such that a switching between the at least two IDs is done by the switch position of said switch.

4. The belt buckle configuration according to claim 2, including an LC oscillator circuit operatively connected to said switch, wherein said LC oscillator circuit operates as said transmitting device and wherein said LC oscillator circuit is detunable with said switch.

5. The belt buckle configuration according to claim 2, wherein:
   the motor vehicle includes a vehicle seat; and
   said communicating device includes a transponder, wherein said transponder operates as said transmitting device, said transponder is disposed in or at said vehicle seat, and said transponder communicates the switch position of said switch to said receiver circuit.

6. The belt buckle configuration according to claim 2, wherein said communicating device includes a seat status sensor for sensing a seat status, and said communicating device is configured to communicate the seat status to said receiver circuit.

7. The belt buckle configuration according to claim 6, wherein said seat status sensor is a seat occupancy sensor.

* * * * *